United States Patent
Suzuki et al.

(10) Patent No.: US 9,422,901 B2
(45) Date of Patent: Aug. 23, 2016

(54) FUEL INJECTION VALVE

(71) Applicant: DENSO CORPORATION, Kariya, Aichi-pref. (JP)

(72) Inventors: Haruki Suzuki, Kasugai (JP); Akinori Harada, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 13/767,209

(22) Filed: Feb. 14, 2013

(65) Prior Publication Data

US 2013/0214066 A1 Aug. 22, 2013

(30) Foreign Application Priority Data

Feb. 20, 2012 (JP) ................... 2012-033577
Aug. 30, 2012 (JP) ................... 2012-190113

(51) Int. Cl.
| | |
|---|---|
| F02M 51/06 | (2006.01) |
| F02M 61/16 | (2006.01) |
| F02M 61/18 | (2006.01) |
| A01G 25/02 | (2006.01) |
| F02M 45/08 | (2006.01) |

(52) U.S. Cl.
CPC ........ F02M 51/0685 (2013.01); A01G 25/023 (2013.01); F02M 45/08 (2013.01); F02M 45/083 (2013.01); F02M 61/168 (2013.01); F02M 61/18 (2013.01); F02M 61/1853 (2013.01)

(58) Field of Classification Search
CPC .. A01G 25/023; F02M 61/168; F02M 61/18; F02M 45/083; F02M 45/08; F02M 61/1853
USPC ......................................... 239/533.3–533.12
See application file for complete search history.

(56) References Cited

U.S. PATENT DOCUMENTS

| | | | | | |
|---|---|---|---|---|---|
| 4,563,133 | A | * | 1/1986 | Yasuhara | ...................... 417/295 |
| 4,786,030 | A | * | 11/1988 | Greiner et al. | .......... 251/129.15 |
| 5,203,538 | A | | 4/1993 | Matsunaga et al. | |
| 5,694,903 | A | * | 12/1997 | Ganser | .......................... 123/496 |
| 6,126,094 | A | | 10/2000 | Ricco | |
| 6,279,873 | B1 | | 8/2001 | Eichendorf et al. | |
| 6,367,769 | B1 | * | 4/2002 | Reiter | ................ F02M 51/0671 |
| | | | | | 239/585.5 |

(Continued)

FOREIGN PATENT DOCUMENTS

| | | |
|---|---|---|
| JP | 6-4367 U | 1/1994 |
| JP | 4210523 | 10/2008 |

(Continued)

OTHER PUBLICATIONS

Office Action (3 pages) dated Aug. 26, 2014 issued in corresponding Japanese Patent Application No. 2012-190113 and English translation (7 pages).

(Continued)

*Primary Examiner* — Arthur O Hall
*Assistant Examiner* — Christopher R Dandridge
(74) *Attorney, Agent, or Firm* — Nixon & Vanderhye P.C.

(57) ABSTRACT

A first spring axially urges a needle valve toward an injection hole. A second spring axially urges a movable core toward a stationary core with an urging force that is smaller than an urging force of the first spring. A stopper is placed on one axial side of the movable core where the injection hole is located. The stopper limits movement of the movable core toward the injection hole to limit an amount of compression of the second spring.

11 Claims, 10 Drawing Sheets

(56) References Cited

U.S. PATENT DOCUMENTS

| | | | |
|---|---|---|---|
| 6,520,434 B1 | 2/2003 | Reiter | |
| 7,051,960 B2* | 5/2006 | Oguma | F02M 51/0671 239/585.1 |
| 8,528,842 B2* | 9/2013 | Hoang | F02M 51/0685 123/472 |
| 2008/0277505 A1* | 11/2008 | Hoang | 239/585.5 |

FOREIGN PATENT DOCUMENTS

| | | |
|---|---|---|
| JP | 2010-138886 | 6/2010 |
| JP | 2011-117362 | 6/2011 |

OTHER PUBLICATIONS

Office Action (3 pages) dated Apr. 22, 2014 issued in corresponding Japanese Application No. 2012-190113 and English translation (6 pages).
Decision of Rejection with Decision of Denial of Amendment issued in the JP App. 2012-190113, mailed Feb. 17, 2015 (with partial English translation).
Japanese Office Action issued in Application No. 2012-190113 dated Nov. 24, 2015 (w/ translation).
Office Action issued in JP App. No. 2012-190113 dated Jun. 5, 2015 (with English translation).
Office Action issued in U.S. Appl. No. 15/041,122 dated Apr. 28, 2016.

* cited by examiner

FUEL INJECTION VALVE

CROSS REFERENCE TO RELATED APPLICATION

This application is based on and incorporates herein by reference Japanese Patent Application No. 2012-33577 filed on Feb. 20, 2012 and Japanese Patent Application No. 2012-190113 filed on Aug. 30, 2012.

TECHNICAL FIELD

The present disclosure relates to a fuel injection valve.

BACKGROUND

A solenoid type fuel injection valve (injector) is known. The solenoid type fuel injection valve receives high pressure fuel from a delivery pipe, which accumulates fuel received from a high pressure pump that pumps fuel from a fuel tank. The fuel injection valve injects the received high pressure fuel into an internal combustion engine of a vehicle (e.g., an automobile).

For instance, JP2002-506502A (corresponding to U.S. Pat. No. 6,279,873B1) teaches such a fuel injection valve. Specifically, in a deenergized state of a coil of this fuel injection valve, a needle valve is urged by an urging force of a first return spring, so that the needle valve is seated against a valve seat. Furthermore, a movable core is urged against a stopper element by an urging force of a second return spring. At this time, a small gap is formed between a flange of the needle valve and the movable core.

At the time of executing a valve-opening operation, the coil is energized, so that the movable core is magnetically attracted to the stationary core, and the movable core abuts against the flange of the needle valve in the accelerated state of the movable core. In this way, a valve-opening time period, which is a time period required to open the injection hole by lifting the needle valve away from the valve seat, is shortened.

However, in the fuel injection valve of JP2002-506502A (corresponding to U.S. Pat. No. 6,279,873B1), both of the first return spring and the second return spring urge the movable core toward the fuel injection hole at the time of executing a valve-closing operation, which is executed to seat the needle valve against the valve seat. Therefore, when the state of the coil is changed from the energized state to the deenergized state, the movable core, which is moved together with the needle valve toward the injection hole, is urged by the urging force of the second return spring and the inertia of the movable core and thereby collides against the stopper element upon the seating of the needle valve against the valve seat. Thereafter, the movable core rebounds from the stopper element. When the collision force of the movable core against the flange of the needle is increased, a secondary valve-opening movement of the needle valve occurs to reopen the injection hole. Thereby, it may possibly be difficult to accurately control the fuel injection quantity of the fuel injection valve.

Furthermore, when the collision force of the movable core against the stopper element is increased, the collision noise may possibly be increased. Also, the collision of the movable core against the stopper element may possibly damage the movable core and/or the stopper element.

SUMMARY

The present disclosure addresses the above disadvantage. According to the present disclosure, there is provided a fuel injection valve, which includes a housing, a needle valve, a coil, a stationary core, a movable core, a first spring, a second spring and a stopper. The housing is configured into a tubular body and has an injection hole, a fuel passage and a valve seat. Fuel is injected through the injection hole. The fuel passage is communicated with the injection hole. The valve seat is formed in an inner wall of the fuel passage. The needle valve is received in the housing and is axially reciprocatable in the housing. The needle valve has a flange that radially outwardly projects. The needle valve opens the injection hole when the needle valve is lifted away from the valve seat. The needle valve closes the injection hole when the needle valve is seated against the valve seat. The coil generates a magnetic field in an energized state of the coil. The stationary core is fixed in the housing at a corresponding location that is within a range of the magnetic field generated from the coil. The movable core is axially reciprocatable and is placed on one axial side of the stationary core where the injection hole is located. The movable core is contactable with an end surface of the flange of the needle valve, which is located on an axial side where the injection hole is located. The first spring axially urges the needle valve toward the injection hole. The second spring axially urges the movable core toward the stationary core with an urging force that is smaller than an urging force of the first spring, which axially urges the needle valve toward the injection hole. The stopper is placed on one axial side of the movable core where the injection hole is located. The stopper limits movement of the movable core toward the injection hole to limit an amount of compression of the second spring.

BRIEF DESCRIPTION OF THE DRAWINGS

The drawings described herein are for illustration purposes only and are not intended to limit the scope of the present disclosure in any way.

DETAILED DESCRIPTION

Embodiments of the present disclosure will be described with reference to the accompanying drawings.

First Embodiment

FIGS. 1 to 6 show a fuel injection valve according to a first embodiment of the present disclosure. The fuel injection valve 1 receives high pressure fuel from a delivery pipe, which accumulates fuel received from a high pressure pump that pumps fuel from a fuel tank. The fuel injection valve 1 injects the received high pressure fuel into an internal combustion engine of a vehicle (e.g., an automobile).

Figure 1:
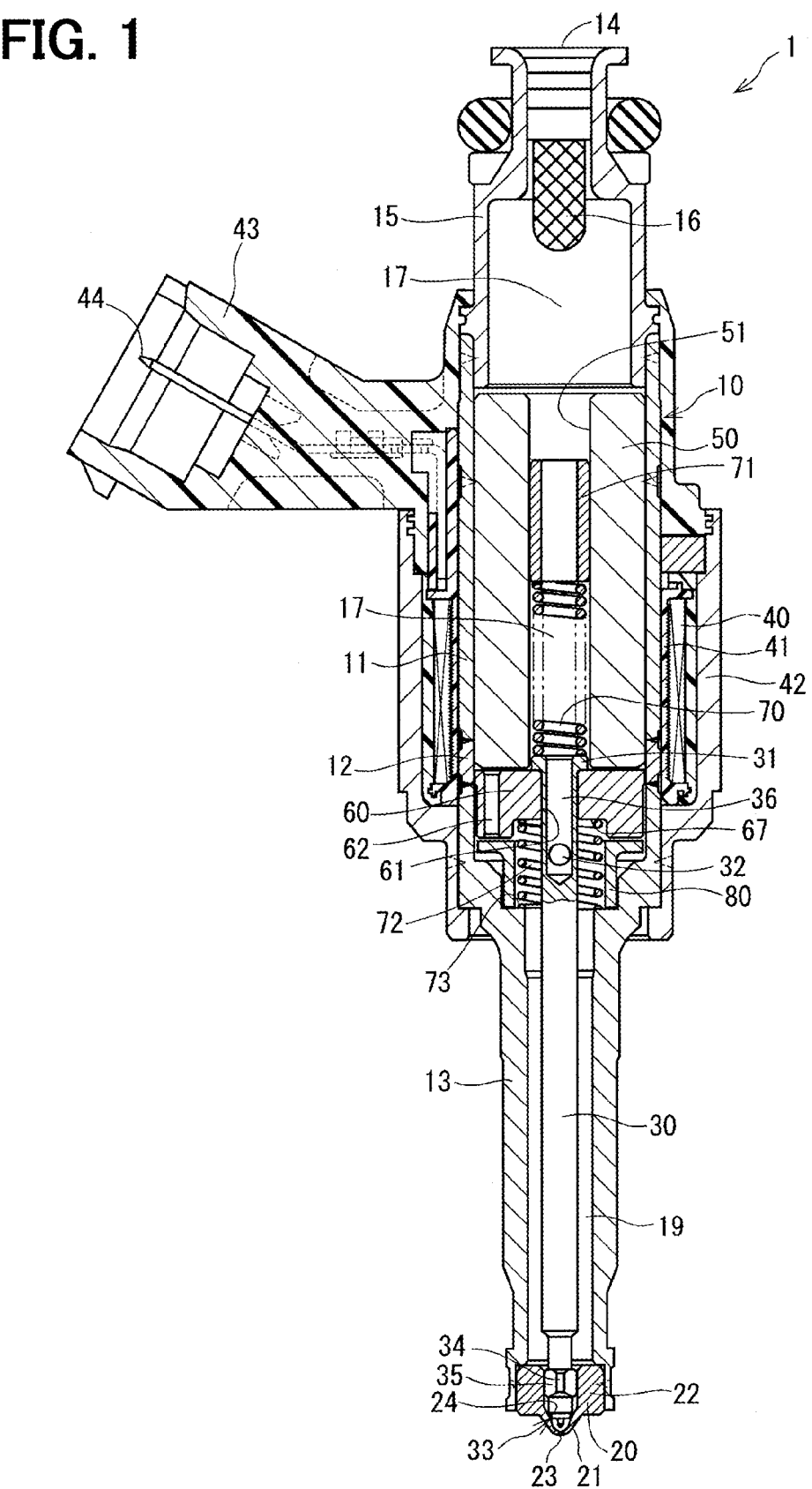
FIG. 1 is a cross-sectional view of a fuel injection valve according to a first embodiment of the present disclosure.
Figure 2:
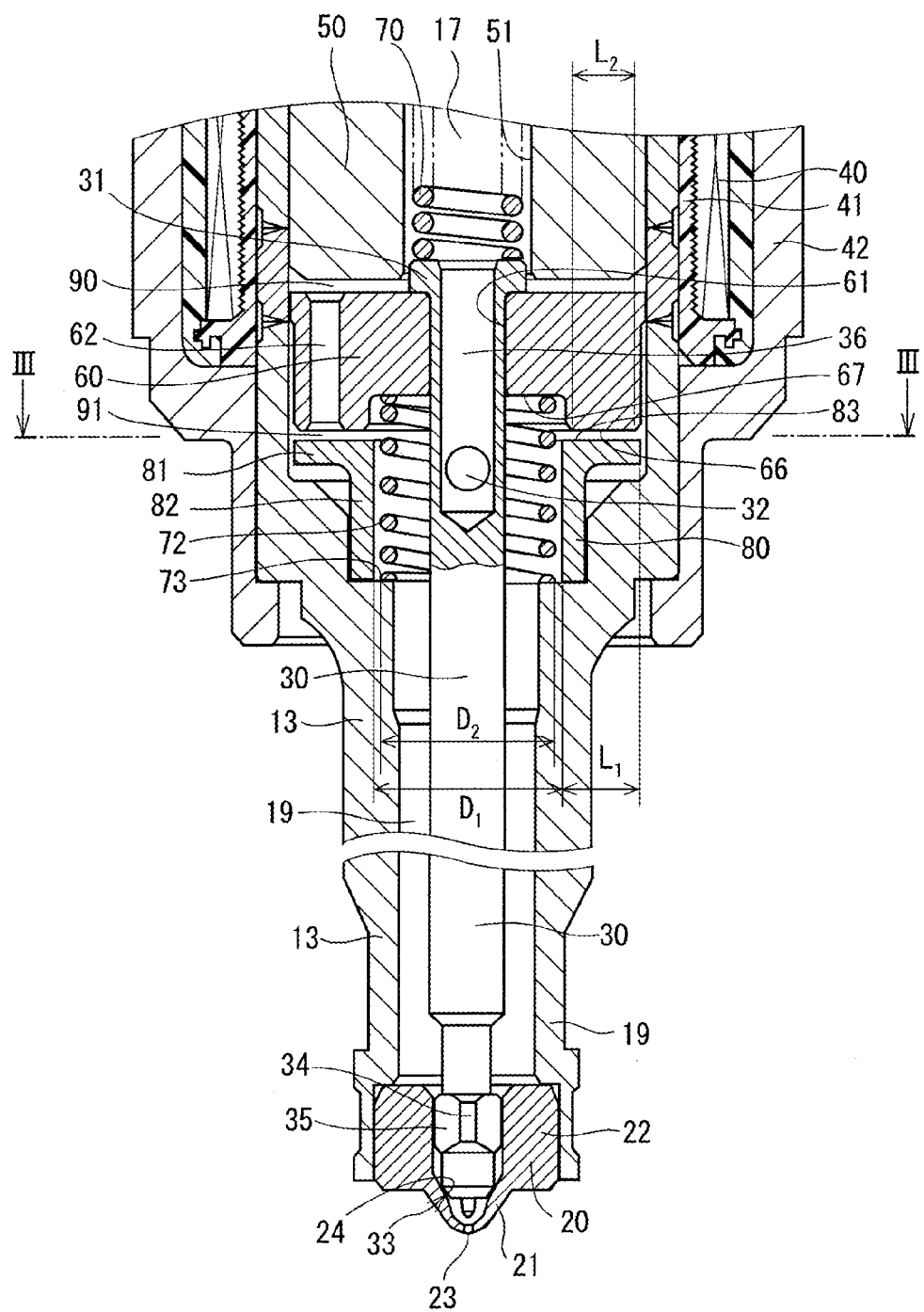
FIG. 2 is a partial enlarged cross-sectional view of FIG. 1 showing a main feature of the fuel injection valve of the first embodiment.

As shown in FIGS. 1 and 2, the fuel injection valve 1 includes a housing 10, a needle valve 30, a coil 40, a stationary core 50, a movable core 60 and a stopper 80.

The housing 10 includes a tubular member 11, a non-magnetic portion 12, a holder 13, an inlet member 15 and a nozzle body 20. The housing 10 serves as a housing of the present disclosure.

The tubular member 11, the non-magnetic portion 12 and the holder 13 are configured into generally cylindrical tubular bodies, respectively, and are joined one after another in this order from a fuel inlet 14 side (i.e., an axial side where the fuel inlet 14 is located). The tubular member 11 and the holder 13 are made of a magnetic material. The non-magnetic portion 12 is made of a non-magnetic material and limits magnetic short-circuit between the tubular member 11 and the holder 13.

The inlet member 15, which is configured into a tubular body and forms the fuel inlet 14, is joined to an end portion of the tubular member 11, which is opposite from the non-magnetic portion 12. A filter 16 is placed in the inlet member 15 at a location that is radially inward of the inlet member 15. The fuel, which is supplied through the fuel inlet 14, is filtered through the filter 16 and is supplied to an upstream passage 17 that is formed in an inside of the housing 10.

The housing 10 has a nozzle body 20 at an end portion of the housing 10, which is opposite from the non-magnetic portion 12 of the holder 13. The nozzle body 20 is configured into a cup shape body and has a bottom portion (a bottom wall portion) 21 and a tubular portion (peripheral wall portion) 22. The tubular portion 22 is joined to an inner peripheral portion of the holder 13. An injection hole 23 is formed to axially extend through the bottom portion 21. A valve seat 24, which is recessed and is tapered, is formed in an inner wall of the bottom portion 21.

The needle valve 30 is configured into a cylindrical rod body and is received in the housing 10 such that the needle valve 30 is reciprocatable in the axial direction in the housing 10.

The needle valve 30 has a flange 31. The flange 31 radially outwardly projects from a fuel inlet 14 side end portion of the needle valve 30 (i.e., an end portion of the needle valve 30 located on an axial side where the fuel inlet 14 is placed). The flange 31 is configured into an annular form. The flange 31 can contact a fuel inlet 14 side end surface of the movable core 60 (i.e., an end surface of the movable core 60 located on an axial side where the fuel inlet 14 is placed).

A downstream passage 19 is radially defined between the needle valve 30 and the holder 13 and extends in the axial direction in the inside of the holder 13. The upstream passage 17 and the downstream passage 19 serve as a fuel passage of the present disclosure.

The needle valve 30 has an inside passage 36, which axially extends along a central axis of the needle valve 30. The needle valve 30 has a flow outlet 32, which radially extends through the needle valve 30 from an inner wall of the inside passage 36 to an outer wall of the needle valve 30. Thereby, the inside passage 36 communicates between the upstream passage 17 and the downstream passage 19 through the flow outlet 32.

A seat portion 33 is formed in an injection hole 23 side end portion of the needle valve 30 (i.e., an end portion of the needle valve 30 located on an axial side where the injection hole 23 is placed). The seat portion 33 is contactable with, i.e., is seatable against the valve seat 24. A slideable portion 34 is formed in the needle valve 30 at a location, which is axially spaced from the seat portion 33 by a predetermined distance. The slideable portion 34 is slideable along an inner peripheral wall of the tubular portion 22 of the nozzle body 20. A chamfered portion 35 is formed in a portion of an outer peripheral wall of the slideable portion 34. Fuel can flow between the chamfered portion 35 and the inner peripheral wall of the tubular portion 22.

When the seat portion 33 is seated against the valve seat 24, the needle valve 30 closes the downstream passage 19, which is communicated with the injection hole 23. Then, when the seat portion 33 is lifted away from the valve seat 24, the needle valve 30 opens the downstream passage 19, which is communicated with the injection hole 23.

Hereinafter, the lifting direction of the needle valve 30 away from the valve seat 24 will be referred to as a valve-opening direction. Furthermore, a seating direction of the needle valve 30 toward the valve seat 24 will be referred to as a valve-closing direction.

The fuel injection valve 1 includes a solenoid drive device, which drives the needle valve 30. The solenoid drive device includes a coil 40, a stationary core 50 and a movable core 60.

A spool 41 is placed on a radially outer side of the tubular member 11 and the non-magnetic portion 12 of the housing 10. The coil 40 is wound around the spool 41. A yoke 42, which is configured into a tubular body and is made of a magnetic material, covers an outer peripheral portion of the coil 40. The coil 40 is electrically connected to terminals 44 of a connector 43. When the coil 40 is energized through the connector 43, the coil 40 generates a magnetic field.

The stationary core 50 is configured into a generally cylindrical tubular body and is made of a magnetic material. The stationary core 50 is fixed to an inner peripheral wall of the tubular member 11 and an inner peripheral wall of the non-magnetic portion 12. A hole 51 is formed in the stationary core 50 such that the hole 51 axially extends along a central axis of the stationary core 50. A first spring 70 is inserted in the hole 51 of the stationary core 50. One end portion of the first spring 70 contacts the flange 31 of the needle valve 30, and the other end portion of the first spring 70, which is opposite from the one end portion of the first spring 70, contacts an adjusting pipe 71 that is securely press-fitted into an inside of the stationary core 50. A load of the first spring 70 is set depending on the amount of insertion of the adjusting pipe 71 into the inside of the stationary core 50. The first spring 70 urges the needle valve 30 toward the injection hole 23.

The movable core 60 is configured into a generally cylindrical tubular body and is made of a magnetic material. The movable core 60 is formed separately from the needle valve 30 and is axially placed on the injection hole 23 side of the stationary core 50.

The movable core 60 is placed radially inward of the housing 10 in a manner that enables axial reciprocation of the movable core 60 in the housing 10. In a deenergized state of the coil 40, a predetermined gap 90 is formed between the movable core 60 and the stationary core 50.

A center hole 61 is formed in the movable core 60 such that the center hole 61 axially extends through the movable core 60 at a center portion of the movable core 60. The needle valve 30 is received through the center hole 61 of the movable core 60. A portion of the needle valve 30, which is placed radially inward of the movable core 60, is slideable along an inner peripheral wall of the center hole 61 of the movable core 60. The needle valve 30 is reciprocatably received in the housing 10 such that the needle valve 30 is guided at two portions of the needle valve 30, i.e., the slideable portion 34 of the needle valve 30, which is axially located at the nozzle body 20 side, and the portion of the needle valve 30, which is located radially inward of the movable core 60.

The movable core 60 includes a plurality of communication holes 62. The communication holes 62 communicate between the gap 90, which is formed between the stationary core 50 and the movable core 60, and a gap 91, which is formed between the movable core 60 and the stopper 80. The axial moving speed of the movable core 60 is adjustable through setting of the number of the communication holes 62, the inner diameter(s) of the communication holes 62 and the location(s) of the communication holes 62. In the present embodiment, the number of the communication holes 62 is three, and these communication holes 62 are arranged one after another in the circumferential direction.

A second spring 72 is placed such that one end portion of the second spring 72 contacts an end surface of a recess 67 of the movable core 60, which is axially placed on the injection hole 23 side, and the other end portion of the second spring 72 contacts a stepped surface 73 of the holder 13. The second spring 72 urges the movable core 60 in the valve-opening direction. In the deenergized state of the coil 40, the second spring 72 exerts the urging force against the movable core 60, so that the fuel inlet 14 side end surface of the movable core 60 contacts the injection hole 23 side end surface of the flange 31 of the needle valve 30. Therefore, when the coil 40 is energized, the movable core 60 and the needle valve 30 are simultaneously moved together. Thus, the valve-opening response of the fuel injection valve 1 at the time of lifting the needle valve 30 away from the valve seat 24 is improved.

The urging force of the first spring 70 is set to be higher than the urging force of the second spring 72. Therefore, in the deenergized state of the coil 40, the seat portion 33 of the needle valve 30 is seated against the valve seat 24.

The stopper 80 is provided on the injection hole 23 side of the movable core 60. The stopper 80 is made of a non-magnetic material and includes a circular disk portion (a ring portion, an annular portion) 81 and a tubular portion 82. The tubular portion 82 axially extends from an inner peripheral edge part of the circular disk portion 81 toward the injection hole 23. An outer peripheral wall of the tubular portion 82 is press-fitted to an inner peripheral wall of the holder 13. Alternatively, the stopper 80 may be configured such that the circular disk portion 81 is press-fitted to the inner peripheral wall of the holder 13.

Figure 3:
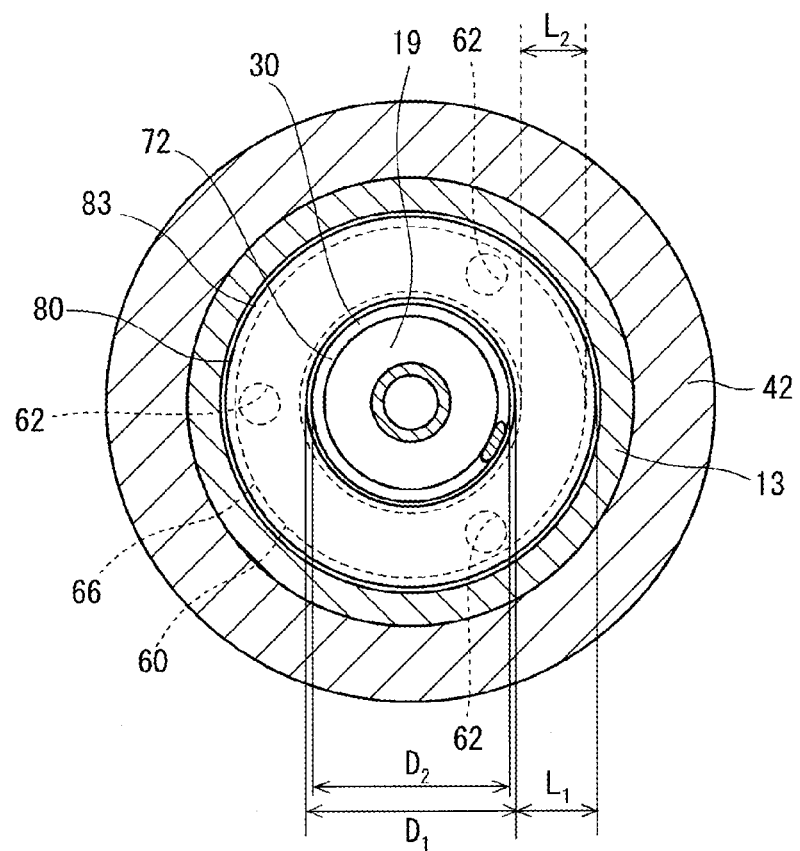
FIG. 3 is a cross-sectional view taken along line III-III in FIG. 2.

The circular disk portion 81 of the stopper 80 limits movement of the movable core 60 toward the injection hole 23 side to limit the amount of compression of the second spring 72 at the time of moving the movable core 60 toward the injection hole 23. In FIG. 3, the movable core 60 is indicated by a dotted line. As shown in FIGS. 2 and 3, a radial length (radial extent) L1 of a first contact surface 83 of the circular disk portion 81, which is located on the movable core 60 side, is larger than a radial length (radial extent) L2 of a second contact surface 66 of the movable core 60, which is located on the injection hole 23 side. That is, when the first contact surface 83 and the second contact surface 66 are projected onto an imaginary surface (imaginary plane) that is perpendicular to the axis of the needle valve 30, the second contact surface 66 is entirely received within the inside of the first contact surface 83. With this construction, a squeezing force, which is exerted at the time of colliding the second contact surface 66 against the first contact surface 83, and a linking force, which is exerted at the time of separating the second contact surface 66 away from the first contact surface 83, are increased. The squeezing force is a force of the fluid held between the first contact surface 83 and the second contact surface 66. The linking force is a force, which interferes with separation between two articles in the fluid.

As shown in FIG. 2, an inner diameter D1 of the tubular portion 82 of the stopper 80 is set to be slightly larger than an outer diameter D2 of the second spring 72 to limit tilting of the second spring 72. With this setting, the inner peripheral wall of the tubular portion 82 of the stopper 80 can axially guide the second spring 72. Thus, a predetermined orientation of the second spring 72 is maintained, and thereby the load of the second spring 72, which urges the movable core 60, is stabilized. Furthermore, a predetermined orientation of the movable core 60 is maintained, and thereby generation of an unintentional frictional force between the movable core 60 and the holder 13 or the non-magnetic portion 12 can be limited.

Next, the operation of the fuel injection valve 1 will be described.

The fuel, which is supplied from the fuel inlet 14 to the upstream passage 17, is filled in the inside passage 36 of the needle valve 30 and the downstream passage 19.

FIG. 2 shows the deenergized state of the coil 40. The needle valve 30 is urged by the first spring 70, so that the seat portion 33 is seated against the valve seat 24. The movable core 60 is urged against the injection hole 23 side end surface of the flange 31 of the needle valve 30 by the urging force of the second spring 72. At this time, the small gap 91 is formed between the movable core 60 and the stopper 80. The gap 91 between the movable core 60 and the stopper 80 is exaggerated in FIGS. 2 and 4. Actually, the axial size of the gap 91 is, for example, about 30 μm.

Now, a valve-opening operation of the fuel injection valve 1 will be described.

When the coil 40 is energized, the magnetic field is generated by the coil 40. Therefore, as indicated by arrows B in FIG. 6, the magnetic flux flows through a magnetic circuit, which is formed by the stationary core 50, the tubular member 11, the yoke 42, the holder 13 and the movable core 60. The stopper 80 is made of the non-magnetic material. Therefore, the leakage of the magnetic flux from the holder 13 to the stopper 80 is reduced or limited. Thus, the density of the magnetic flux, which flows between the movable core 60 and the stationary core 50, is increased.

Figure 4:
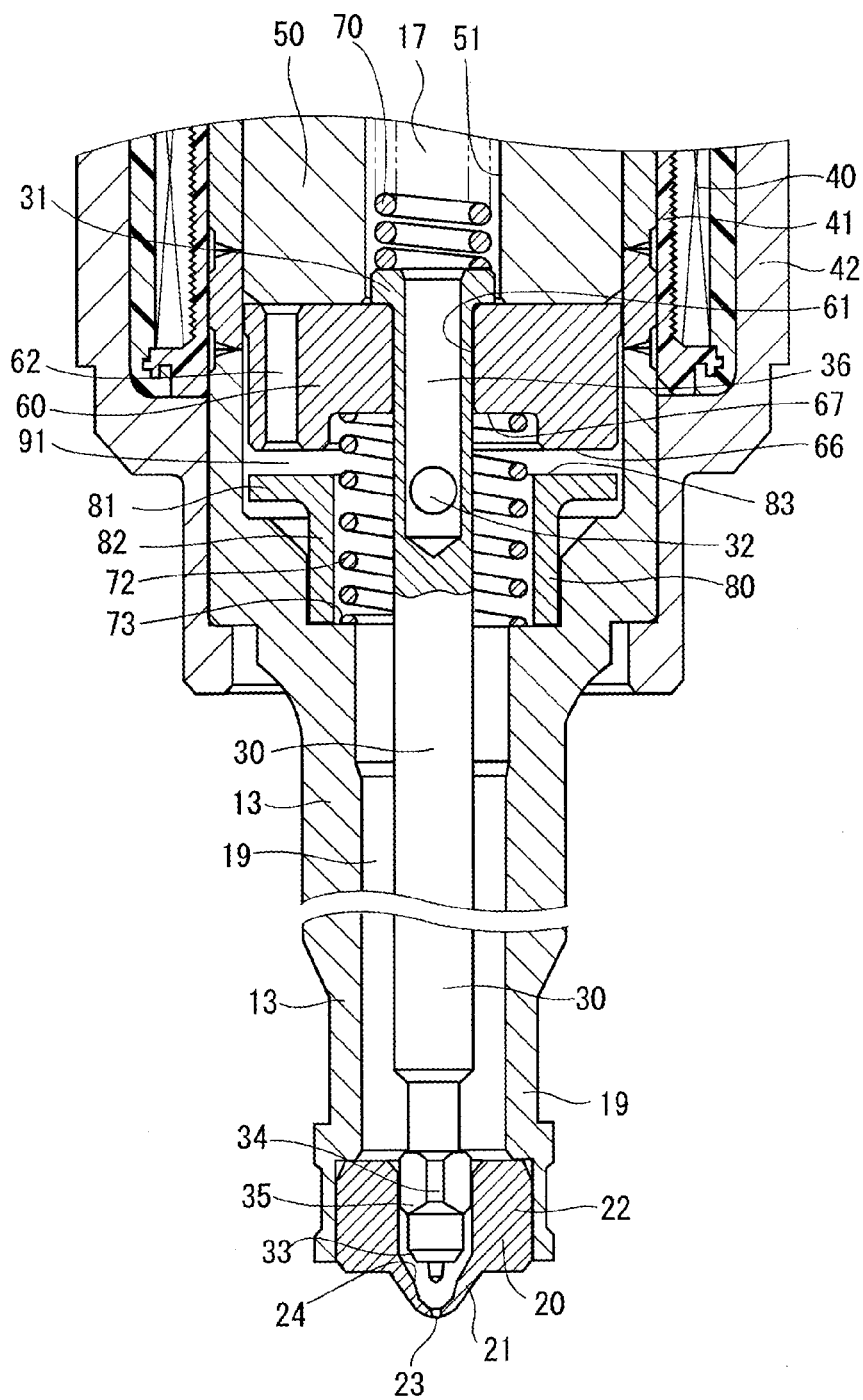
FIG. 4 is a partial enlarged view of the fuel injection valve of the first embodiment, showing a valve-opening operation of the fuel injection valve.

When the magnetic attractive force is exerted between the movable core 60 and the stationary core 50, the movable core 60 is magnetically attracted to the stationary core 50, as indicated in FIG. 4. When the movable core 60 contacts the stationary core 50, the communication holes 62 of the movable core 60 are closed by the stationary core 50. Furthermore, the movable core 60 contacts the flange 31, so that the needle valve 30 and the movable core 60 are moved together in the valve-opening direction. As a result, the seat portion 33 is lifted away from the valve seat 24 to open the injection hole 23, and thereby the fuel is injected through the injection hole 23.

Next, a valve-closing operation of the fuel injection valve 1 will be described.

When the coil 40 is deenergized, the needle valve 30 is moved together with the movable core 60 in the valve-closing direction. As shown in FIG. 2, when the seat portion 33 of the needle valve 30 is seated against the valve seat 24, the fuel injection is stopped.

Figure 5:
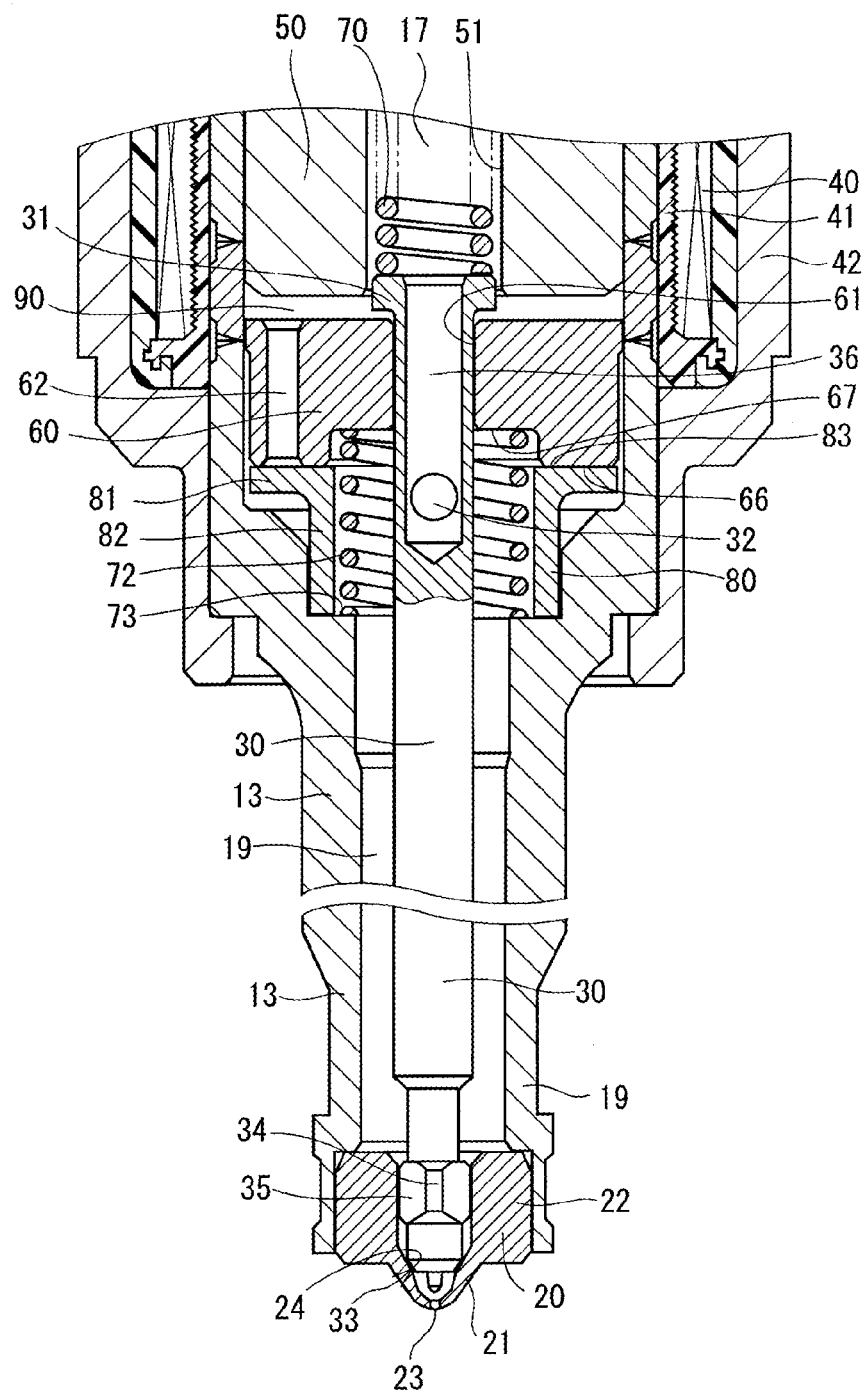
FIG. 5 is a partial enlarged view of the fuel injection valve of the first embodiment, showing a valve-closing operation of the fuel injection valve.
Figure 6:
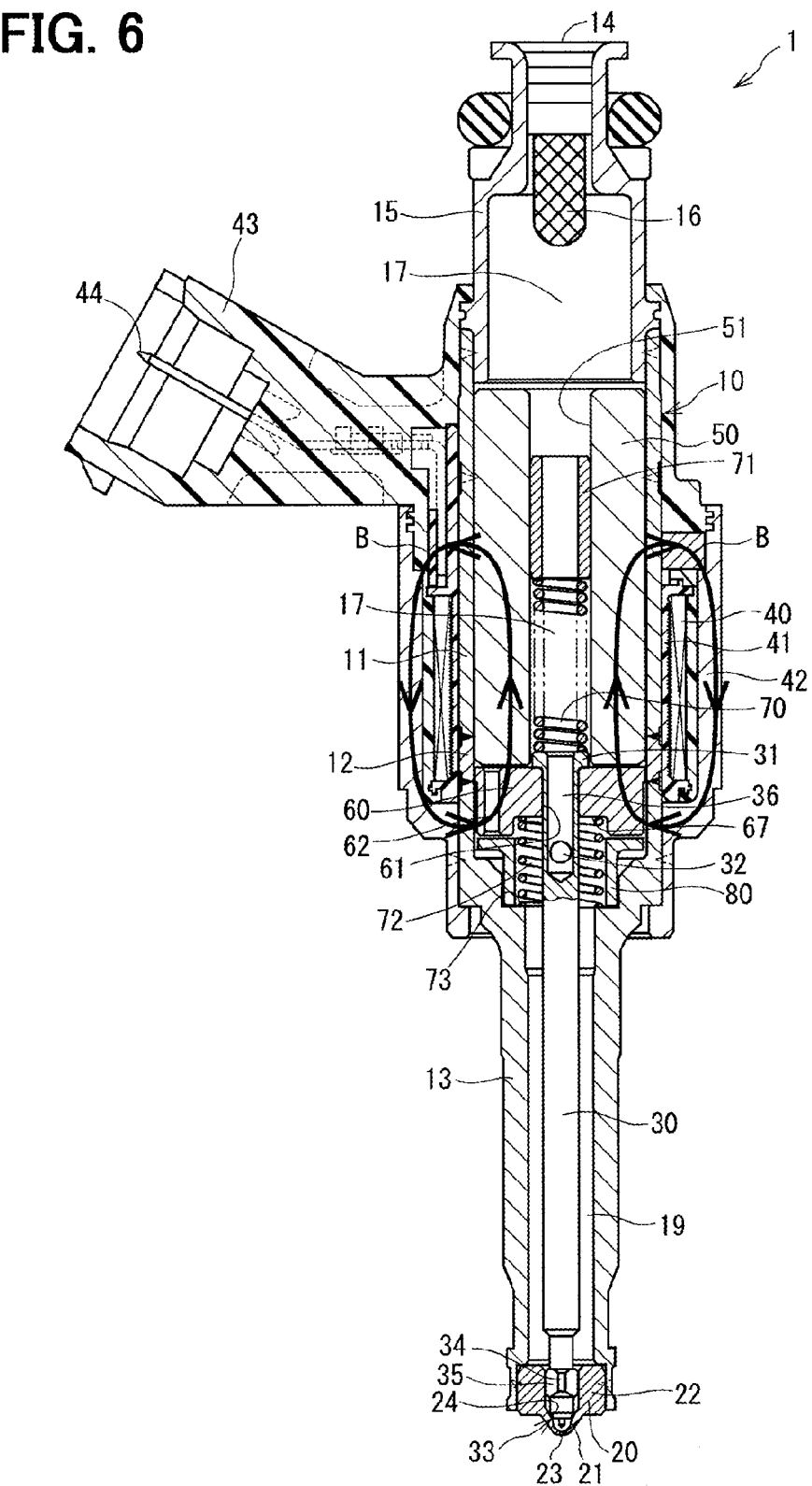
FIG. 6 is a diagram showing a flow of a magnetic flux in the valve-opening operation of the fuel injection valve of the first embodiment.

Thereafter, the movable core 60 is kept moving in the valve-closing direction by inertia. At this time, the urging force of the second spring 72 is exerted to reduce the moving speed of the movable core 60. As shown in FIG. 5, when the movable core 60 contacts the stopper 80, the movement of the movable core 60 in the valve-closing direction is limited. Therefore, the amount of compression of the second spring 72 is limited.

When the movable core 60 contacts the stopper 80, the communication holes 62 of the movable core 60 are closed by the stopper 80. The first contact surface 83 of the stopper 80 can entirely contact the second contact surface 66 of the movable core 60. Therefore, the contact pressure, which is exerted between the first contact surface 83 and the second contact surface 66 at the time of collision of the second contact surface 66 against the first contact surface 83, is relatively small. Furthermore, the squeezing force, which is exerted at the time of colliding the second contact surface 66 against the first contact surface 83, and the linking force, which is exerted at the time of separating the second contact surface 66 away from the first contact surface 83, are relatively large. Thereby, the damper effect, which reduces the moving speed of the movable core 60, is generated. Thus, when the movable core 60 rebounds from the stopper 80 after the collision of the movable core 60 against the stopper 80, the moving speed of the movable core 60 in the rebound motion of the movable core 60 away from the stopper 80 is reduced.

Furthermore, the axial size of the gap 91 between the movable core 60 and the stopper 80 is set to a value, which enables reduction of the collision force of the movable core 60 against the flange 31 of the needle valve 30 at the time of rebound of the movable core 60 toward the stationary core 50 to limit the secondary valve-opening movement of the needle valve 30 away from the valve seat 24.

Specifically, the resilient force, which is accumulated in the second spring 72, is reduced by the stopper 80, so that the moving speed of the movable core 60 in the rebound motion of the movable core 60 toward the stationary core 50 is reduced. Furthermore, the gap 91 between the movable core 60 and the stopper 80 is appropriately set, so that the collision force of the movable core 60 against the flange 31 of the needle valve 30 is reduced. Therefore, as shown in FIG. 2, when the movable core 60 contacts the flange 31 of the needle valve 30, the movement of the needle valve 30 in the valve-opening direction is limited. Thus, the secondary valve-opening movement of the needle valve 30 away from the valve seat 24 is advantageously limited.

Now, the advantages of the present embodiment will be described.

(1) In the present embodiment, when the energization of the coil 40 is turned off to place the coil 40 into the deenergized state in the valve-closing operation of the needle valve 30, the movable core 60 is moved together with the needle valve 30 toward the injection hole 23 by the urging force of the first spring 70. At this time, the movement of the movable core 60 toward the injection hole 23 is limited by the stopper 80, so that the movement of the movable core 60 toward the injection hole 23 is minimized. Therefore, the amount of compression of the second spring 72 is reduced, and thereby the urging force, which is accumulated in the second spring 72, is reduced.

Furthermore, the contact pressure, which is exerted between the first contact surface 83 of the stopper 80 and the second contact surface 66 of the movable core 60 at the time of collision of the second contact surface 66 of the movable core 60 against the first contact surface 83 of the stopper 80, is relatively small. Furthermore, the squeezing force, which is exerted between the first contact surface 83 and the second contact surface 66 at the time of collision of the second contact surface 66 against the first contact surface 83, and the linking force, which is exerted between the first contact surface 83 and the second contact surface 66 at the time of separation of the first contact surface 83 and the second contact surface 66 from each other, are relatively large. Therefore, the damping effect, which reduces the moving speed of the movable core 60, can be generated. Thus, the moving speed of the movable core 60 in the rebound motion of the movable core 60 away from the stopper 80 is reduced, and thereby the collision force of the movable core 60 against the needle valve 30 is reduced.

Furthermore, the axial size of the gap 91, which is formed between the stopper 80 and the movable core 60 in the deenergized state of the coil 40, is set to the value, which enables limiting of the secondary valve opening movement of the needle valve 30 away from the valve seat 24 by reducing the collision force of the movable core 60 against the flange 31 of the needle valve 30 at the time of the rebound of the movable core 60 toward the stationary core 50.

Therefore, the fuel injection valve 1 can limit the secondary opening of the injection hole 23, which results from the secondary valve-opening movement of the needle valve 30 away from the valve seat 24, at the time of valve-closing operation of the needle valve 30.

Furthermore, the contact pressure, which is exerted between the first contact surface 83 and the second contact surface 66 at the time of collision of the second contact surface 66 against the first contact surface 83, is reduced. Therefore, the durability of the stopper 80 and the durability of the movable core 60 can be improved.

(2) In the present embodiment, the movable core 60 has the communication holes 62. The communication holes 62 communicate between the gap 90, which is formed between the stationary core 50 and the movable core 60, and the gap 91, which is formed between the movable core 60 and the stopper 80. The axial moving speed of the movable core 60 in the reciprocating motion thereof is adjustable through setting of the location(s), the inner diameter(s) and the number of the communication holes 62. Therefore, the fuel injection valve 1 can limit the secondary valve-opening movement of the needle valve 30 away from the valve seat 24 at the time of valve-closing operation of the needle valve 30 and can improve the valve-opening response and the valve-closing response of the needle valve 30 at the time of energization and deenergization, respectively, of the coil 40.

(3) In the present embodiment, the tubular portion 82 of the stopper 80 can axially guide the second spring 72 along the inner peripheral wall of the tubular portion 82 of the stopper 80. Thereby, the predetermined orientation of the second spring 72 is maintained. Thus, the load of the second spring 72 against the movable core 60 is stabilized, and the predetermined orientation of the movable core 60 is maintained. As a result, the generation of the unintentional frictional force between the movable core 60 and the inner peripheral wall of the housing can be limited, and thereby the smooth movement of the movable core 60 is maintained. Therefore, the fuel injection valve 1 can limit the secondary valve-opening movement of the needle valve 30 away from the valve seat 24 at the time of valve-closing operation of the needle valve 30 and can improve the valve-opening response and the valve-closing response of the needle valve 30 at the time of energization and deenergization, respectively, of the coil 40.

(4) In the present embodiment, the inside passage 36 of the needle valve 30 communicates between the upstream passage 17 and the downstream passage 19 through the flow outlet 32, which is formed at the radially inner side of the stopper 80. In this way, even when the communication holes 62 of the movable core 60 are closed by the stationary core 50 or the stopper 80, the fuel can flow between the upstream passage 17 and the downstream passage 19 through the inside passage 36 of the needle valve 30.

(5) In the present embodiment, the stopper 80 is made of the non-magnetic material, so that the magnetic resistance of the stopper 80 is relatively large. Thus, the leakage of the magnetic flux to the stopper 80 can be limited at the time of energization of the coil 40, so that the density of the magnetic flux between the movable core 60 and the stationary core 50 is increased. In this way, it is possible to improve the valve-opening response of the fuel injection valve 1.

(6) In the present embodiment, the needle valve 30 and the movable core 60 are formed separately. Therefore, the collision force, which is exerted at the time of seating of the needle valve 30 against the valve seat 24, is relatively small. Thus, the bounce, i.e., rebound of the needle valve 30 from the valve seat 24 is limited to limit the secondary injection of fuel through the injection hole 23. Furthermore, the operational noise is reduced at the time of seating the needle valve 30 against the valve seat 24.

Second Embodiment

Figure 7:
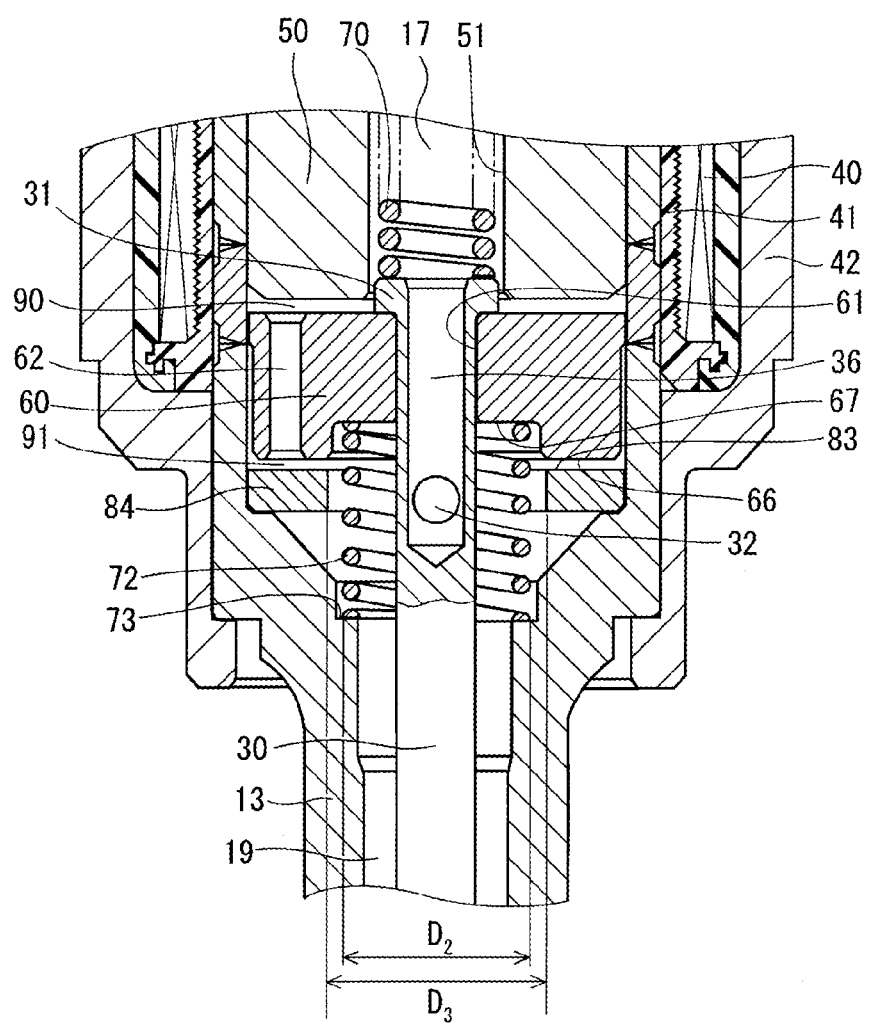
FIG. 7 is a partial enlarged cross-sectional view showing a main feature of a fuel injection valve according to a second embodiment of the present disclosure.

FIG. 7 shows a fuel injection valve according to a second embodiment of the present disclosure. In the following embodiments, the components, which are similar to those of the first embodiment, will be indicated by the same reference numerals and will not be described again to avoid redundancy.

In the second embodiment, a stopper 84 is made only of a circular disk portion. That is, the stopper 84 is configured into the circular disk body (a ring body, i.e., an annular body). The outer peripheral wall of the stopper 84 is press-fitted to the inner peripheral wall of the holder 13. Furthermore, the inner diameter D3 of the stopper 84 is larger than the outer diameter D2 of the second spring 72 to such a degree that the second spring 72 does not contact the stopper 84 upon tilting of the second spring 72.

In the second embodiment, the structure of the stopper 84 is simplified, and thereby the stopper 84 can be easily manufactured. Thereby, the manufacturing costs can be reduced.

Furthermore, the contact between the second spring 72 and the stopper 84 is limited. Therefore, the generation of the unintentional frictional force between the second spring 72 and the stopper 84 can be limited.

Third Embodiment

Figure 8:
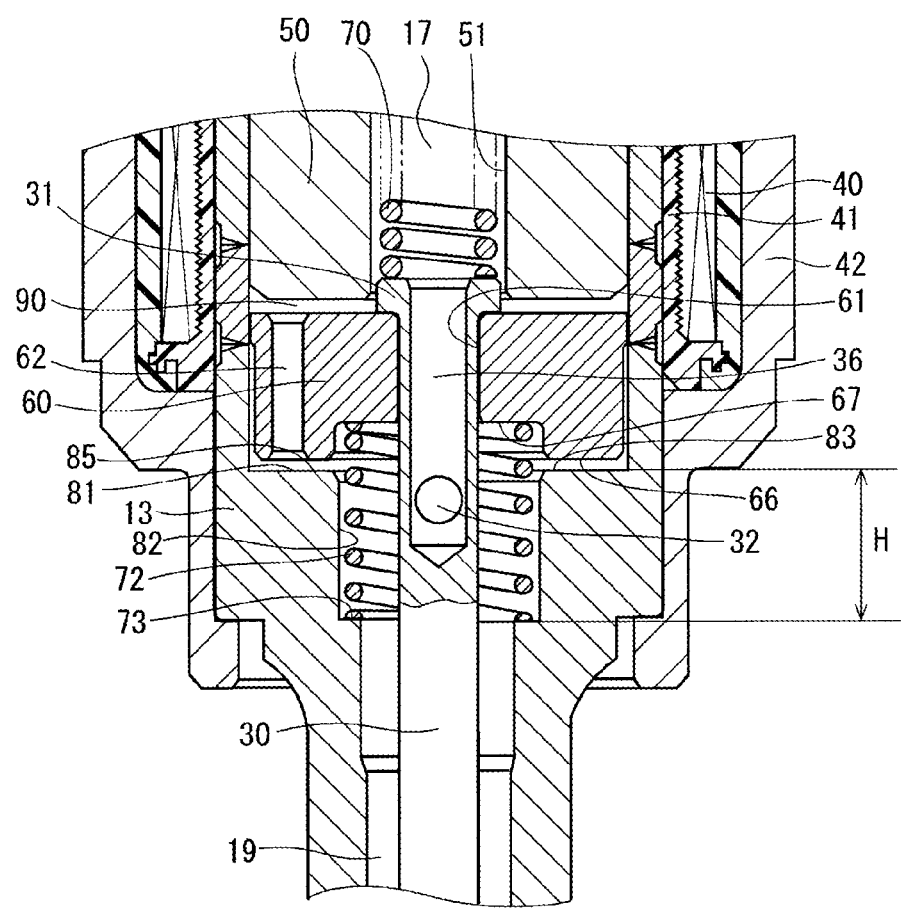
FIG. 8 is a partial enlarged cross-sectional view showing a main feature of a fuel injection valve according to a third embodiment of the present disclosure.

FIG. 8 shows a fuel injection valve according to a third embodiment of the present disclosure. In the third embodiment, the stopper 85 and the holder 13 are formed integrally and seamlessly.

In the third embodiment, the stopper 85 can be manufactured only through management of a distance H between the stepped surface 73 of the holder 13 and the movable core 60 side end surface of the stopper 85. Thus, the number of points of the components, at which the size needs to be managed, can be reduced. Therefore, the clearance between the movable core 60 and the stopper 85 can be accurately formed.

Fourth Embodiment

Figure 9:
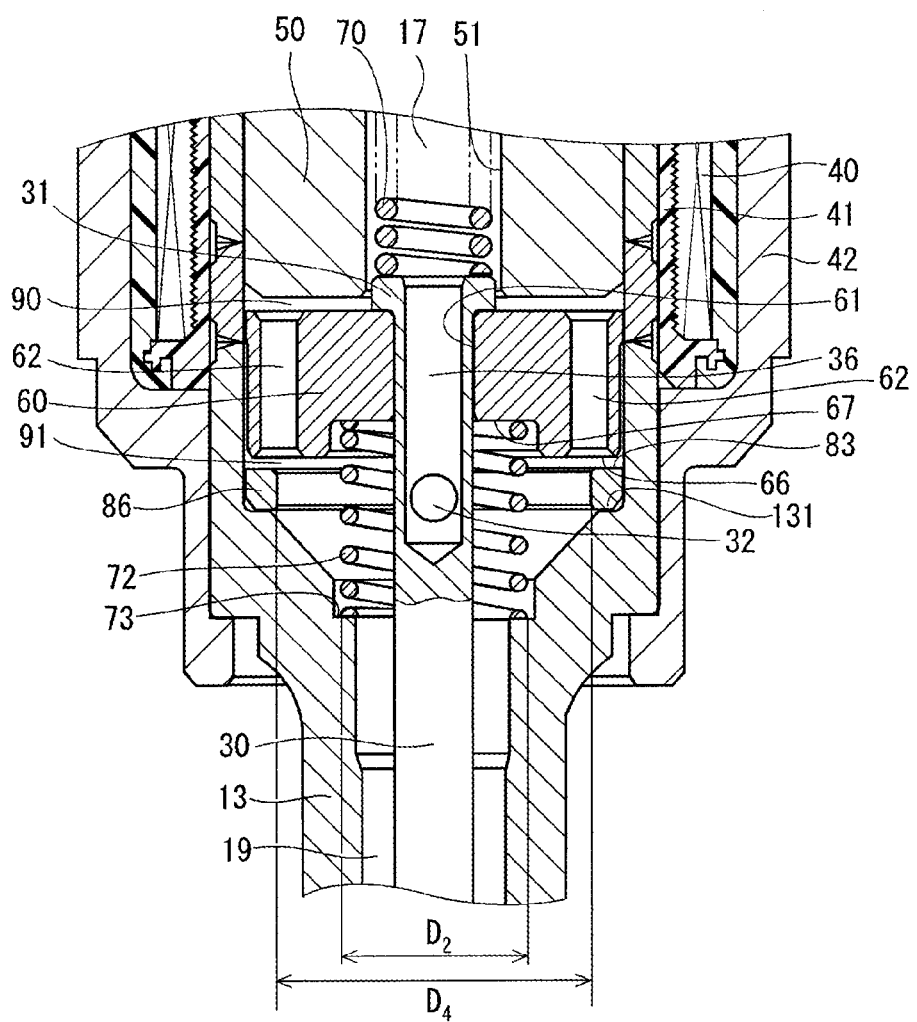
FIG. 9 is a partial enlarged cross-sectional view showing a main feature of a fuel injection valve according to a fourth embodiment of the present disclosure.
Figure 10:
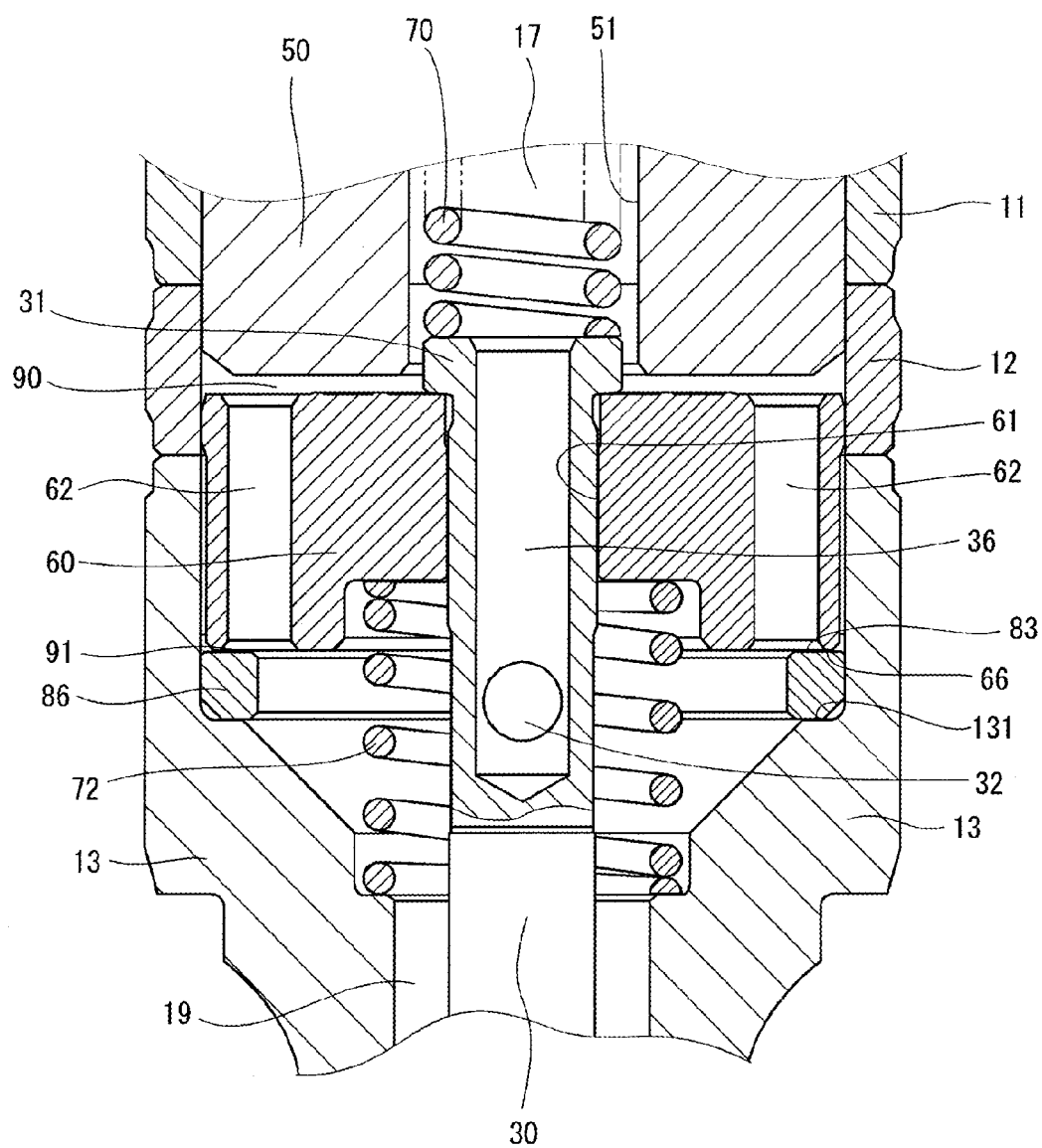
FIG. 10 is a partial enlarged cross-sectional view showing the main feature of the fuel injection valve according to the fourth embodiment.

FIGS. 9 and 10 show a fuel injection valve according to a fourth embodiment of the present disclosure.

Although it is difficult to see the gap 91 between the movable core 60 and the stopper 86 in FIG. 10, the axial size of the gap 91 is set to be about 30 μm in the deenergized state of the coil 40 like in the first to third embodiments. Furthermore, in FIG. 10, the coil, the yoke and the spool are omitted for the sake of simplicity.

In the fourth embodiment, a stopper 86 is configured into a ring body (annular body). Specifically, an inner diameter D4 of the stopper 86 of the fourth embodiment is larger than the inner diameter D3 of the stopper 84 of the second embodiment. Therefore, the space, which is located radially inward of the stopper 86, is widened, and the pressure loss of the fuel, which flows through the downstream passage 19, is reduced.

An outer peripheral wall of the stopper 86 is securely press-fitted to the inner peripheral wall of the holder 13. Furthermore, the injection hole 23 side end surface of the stopper 86 contacts the stepped surface 131 of the holder 13.

In the present embodiment, the number of the communication holes 62, which are arranged one after another in the circumferential direction in the movable core 60, is four. Here, it should be noted that, for instance, the number of the communication holes 62 and the inner diameter(s) of the communication holes 62 can be freely set depending on a need. One end portion of each communication hole 62 is communicated with the gap 90, which is formed between the movable core 60 and the stationary core 50, and the other end portion of the communication hole 62 is communicated with the downstream passage 19. In the contact state of the movable core 60, in which the movable core 60 contacts the stopper 86, about one half of the opening of the communication hole 62 opens to the downstream passage 19.

In the fourth embodiment, the stopper 86 is formed as the simple ring body, so that the processing and the size management of the stopper 86 are relatively easy. Furthermore, since the profile of the stopper 86 is reduced, the manufacturing costs can be reduced, and the weight of the fuel injection valve 1 can be reduced.

Furthermore, the pressure loss of fuel, which flows through the downstream passage 19, can be reduced by increasing the inner diameter of the stopper 86 and increasing the inside space of the stopper 86.

Even in the fourth embodiment, the stopper 86 limits the movement of the movable core 60 at the time of the valve-closing operation of the needle valve 30 to limit the amount of compression of the second spring 72. That is, when the movable core 60 contacts the stopper 86, the resilient force, which is accumulated in the second spring 72, is reduced.

Furthermore, the axial size of the gap 91 between the movable core 60 and the stopper 86 is set to the value, which enables the reduction of the collision force of the movable core 60 against the flange 31 of the needle valve 30 at the time of rebound of the movable core 60 toward the stationary core 50 to limit the secondary valve-opening movement of the needle valve 30 away from the valve seat 24.

Therefore, the fuel injection valve 1 can limit the secondary opening of the injection hole 23 by limiting the secondary valve-opening movement of the needle valve 30 away from the valve seat 24 at the time of valve-closing operation of the needle valve 30.

Now, a modification of the above embodiments will be described.

In the above embodiments, the fuel injection valve, which injects the fuel into the internal combustion engine (more specifically, a cylinder of the internal combustion engine), is described. In a modification of the above embodiment(s), the fuel injection valve may be configured to inject fuel into, for example, an intake air passage of the internal combustion engine.

The present disclosure is not limited the above embodiments and modification thereof. That is, the above embodiments and modification thereof may be modified in various other ways without departing from the principle of the present disclosure.

What is claimed is:

1. A fuel injection valve comprising:
   a housing that is configured into a tubular body and has: an injection hole, through which fuel is injected; a fuel passage that is communicated with the injection hole; and a valve seat that is formed in an inner wall of the fuel passage;
   a needle valve that is received in the housing and is axially reciprocatable in the housing, wherein:
      the needle valve has a flange that radially outwardly projects;
      the needle valve opens the injection hole when the needle valve is lifted away from the valve seat; and
      the needle valve closes the injection hole when the needle valve is seated against the valve seat;
   a coil that generates a magnetic field in an energized state of the coil;
   a stationary core that is fixed in the housing at a corresponding location that is within a range of the magnetic field generated from the coil;
   a movable core that is axially reciprocatable and is placed on one axial side of the stationary core where the injection hole is located, wherein the movable core is contactable with an end surface of the flange of the needle valve, which is located on an axial side where the injection hole is located;
   a first spring that axially urges the needle valve toward the injection hole;
   a second spring that axially urges the movable core toward the stationary core with an urging force that is smaller than an urging force of the first spring, which axially urges the needle valve toward the injection hole; and
   a stopper that is placed on one axial side of the movable core where the injection hole is located, wherein:
      the stopper contacts the movable core to limit movement of the movable core toward the injection hole and to limit an amount of compression of the second spring;
      the needle valve is seated against the valve seat by the urging force of the first spring in a deenergized state of the coil;
      the movable core is urged by the urging force of the second spring to contact the end surface of the flange, which is located on the axial side where the injection hole is located, in the deenergized state of the coil; and
      the movable core is entirely lifted away from the stopper and is entirely separated from the stopper by a gap, which is formed between the stopper and the movable core, in the deenergized state of the coil.

2. The fuel injection valve according to claim 1, wherein an axial size of the gap, which is formed between the stopper and the movable core in the deenergized state of the coil, is set to a value, which enables limiting of secondary valve opening movement of the needle valve away from the valve seat caused by abutment of the movable core against the flange of the needle valve, which is in turn caused by rebound of the movable core from the stopper after contacting of the movable core against the stopper due to inertial movement of the movable core together with the needle valve toward the injection hole upon changing of a state of the coil from the energized state to the deenergized state of the of the coil.

3. The fuel injection valve according to claim 1, wherein the movable core has at least one communication hole that communicates between a gap, which is formed between the movable core and the stationary core in a deenergized state of the coil, and a downstream passage, which is formed between an inner peripheral wall of the stopper and the needle valve.

4. The fuel injection valve according to claim 1, wherein the stopper is configured into a ring body and is fixed to an inner wall of the housing.

5. The fuel injection valve according to claim 1, wherein:
   the stopper includes:
      a circular disk portion that is contactable with the movable core; and
      a tubular portion that axially extends from an inner peripheral edge part of the circular disk portion toward the injection hole; and
   the tubular portion of the stopper is configured to axially guide the second spring along an inner peripheral wall of the tubular portion.

6. The fuel injection valve according to claim 1, wherein:
   the stopper includes only a circular disk portion that is contactable with the movable core; and
   an inner diameter of the circular disk portion is set to a value that is larger than an outer diameter of the second spring and limits contact of the second spring against the circular disk portion upon tilting of the second spring.

7. The fuel injection valve according to claim 1, wherein the stopper is formed separately from the housing and is made of a non-magnetic material.

8. The fuel injection valve according to claim 1, wherein the stopper is formed integrally with the housing.

9. The fuel injection valve according to claim 5, wherein:
   the at least one communication hole of the movable core is closed by the stationary core when the movable core contacts the stationary core; and the at least one communication hole of the movable core is closed by the stopper when the movable core contacts the stopper.

10. The fuel injection valve according to claim 1, wherein the needle valve has:
   an inside passage that axially extends along a central axis of the needle valve; and
   a flow outlet that radially extends from an inner wall of the inside passage to an outer wall of the needle valve.

11. The fuel injection valve according to claim 1, wherein the gap, which is formed between the stopper and the movable core in the deenergized state of the coil, is an uninterrupted axial gap, which radially extends from a radially inner peripheral edge of an end surface of the movable core to a radially outer peripheral edge of the end surface of the movable core.

* * * * *